United States Patent
Brouwer et al.

(10) Patent No.: US 12,448,591 B2
(45) Date of Patent: Oct. 21, 2025

(54) LOW-ALCOHOL BEER WITH REDUCED WORT FLAVOR

(71) Applicant: Heineken Supply Chain B.V., Amsterdam (NL)

(72) Inventors: Eric Richard Brouwer, Alphen aan den Rijn (NL); Hilda Els Smit, Noorden (NL); Albert Doderer, Rijswijk (NL); Augustinus Cornelius Aldegonde Petrus Albert Bekkers, Bunnik (NL)

(73) Assignee: Heineken Supply Chain B.V., Amsterdam (NL)

( * ) Notice: Subject to any disclaimer, the term of this patent is extended or adjusted under 35 U.S.C. 154(b) by 148 days.

(21) Appl. No.: 17/265,599

(22) PCT Filed: Sep. 10, 2018

(86) PCT No.: PCT/NL2018/050587
§ 371 (c)(1),
(2) Date: Feb. 3, 2021

(87) PCT Pub. No.: WO2020/055234
PCT Pub. Date: Mar. 19, 2020

(65) Prior Publication Data
US 2021/0324309 A1    Oct. 21, 2021

(51) Int. Cl.
*C12C 12/04*    (2006.01)
*C12C 5/02*    (2006.01)

(52) U.S. Cl.
CPC ............. *C12C 12/04* (2013.01); *C12C 5/026* (2013.01)

(58) Field of Classification Search
CPC ....... C12C 5/026; C12C 12/00; C12C 12/002; C12C 12/004; C12C 12/006;
(Continued)

(56) References Cited

U.S. PATENT DOCUMENTS

| 4,110,480 A | 8/1978 | Pollock et al. |
| 4,882,177 A * | 11/1989 | Dziondziak ............ C12H 3/02 426/14 |

(Continued)

FOREIGN PATENT DOCUMENTS

| AU | 2013382720 A1 | 9/2015 |
| CO | 20210003796 | 4/2021 |

(Continued)

OTHER PUBLICATIONS

Strejc et al Production of alcohol-free beer with elevated amounts of flavouring compounds using lager yeast mutants. Journal of the Institute of Brewing Jul. 26, 2013 https://onlinelibrary.wiley.com/doi/full/10.1002/jib.72 (Year: 2013).*

(Continued)

*Primary Examiner* — Vera Stulii
(74) *Attorney, Agent, or Firm* — Banner & Witcoff, Ltd.

(57) ABSTRACT

The invention pertains to a beer having an ethanol content of 0-1.0 vol. %, comprising at least 0.001 μg/l eth-yl-2-methylpentanoate (EMP). It has been found that EMP has a strong wort-flavor masking effect. A beer of the invention has low wort-flavor and less overpowering flavor, and is generally considered refreshing.

28 Claims, 1 Drawing Sheet

(58) Field of Classification Search
CPC ....... C12C 12/008; C12C 12/02; C12C 12/04; C12C 11/00; C12C 11/003; C12C 11/006; C12C 11/02; C12C 11/07; C12C 11/075; C12C 11/09; C12C 11/11; C12C 11/06; C12H 3/00

See application file for complete search history.

(56) References Cited

U.S. PATENT DOCUMENTS

| | | | |
|---|---|---|---|
| 4,957,767 | A | 9/1990 | Maria de Kort et al. |
| 5,762,991 | A | 6/1998 | Dziondziak et al. |
| 6,162,360 | A | 12/2000 | Ho et al. |
| 10,301,583 | B2 | 5/2019 | Schuh et al. |
| 10,544,385 | B2 | 1/2020 | Saerens et al. |
| 2005/0163884 | A1 | 7/2005 | Shah et al. |
| 2009/0148586 | A1 | 6/2009 | Siegel et al. |
| 2010/0047422 | A1 | 2/2010 | Magalhaes et al. |
| 2013/0108735 | A1 | 5/2013 | Vanderhaegen |
| 2016/0130540 | A1 | 5/2016 | Malcorps et al. |
| 2017/0260487 | A1 | 9/2017 | De Schutter et al. |
| 2021/0163861 | A1 | 6/2021 | Smit et al. |

FOREIGN PATENT DOCUMENTS

| | | | |
|---|---|---|---|
| EP | 0101254 | A2 | 2/1984 |
| EP | 2266421 | A1 | 12/2010 |
| EP | 2385100 | A1 | 11/2011 |
| EP | 3088507 | A1 | 11/2016 |
| GB | 1121017 | A | 7/1968 |
| GB | 2021146 | | 11/1979 |
| JP | 2003250503 | A | 9/2003 |
| JP | 2010517559 | A | 5/2010 |
| JP | 2013524857 | A | 6/2013 |
| JP | 2014525257 | A | 9/2014 |
| JP | 2015112088 | A | 6/2015 |
| JP | 2016515812 | A | 6/2016 |
| JP | 2016127812 | A | 7/2016 |
| JP | 2016131560 | A | 7/2016 |
| JP | 2016524471 | A | 8/2016 |
| JP | 2017023124 | A | 2/2017 |
| JP | 2017535293 | A | 11/2017 |
| RU | 2419602 | C2 | 5/2011 |
| WO | 9414948 | A1 | 7/1994 |
| WO | 9604363 | A1 | 2/1996 |
| WO | 9907820 | A2 | 2/1999 |
| WO | 2008099325 | A2 | 8/2008 |
| WO | 2010079643 | A1 | 7/2010 |
| WO | 2014141544 | A1 | 9/2014 |
| WO | 2014161998 | A1 | 10/2014 |
| WO | 17075257 | | 5/2017 |
| WO | 2020055233 | A1 | 3/2020 |
| WO | 2020055235 | A1 | 3/2020 |
| WO | 2020055236 | A1 | 3/2020 |

OTHER PUBLICATIONS

Jiang et al., "A novel approach for the production of a non-alcohol beer (<0.5% abv) by a combination of limited fermentation and vacuum distillation", Institute of Brewing & Distilling, vol. 123, pp. 533-536, Oct. 12, 2017 (Year: 2017).*

Akira Nanikawa, Control of Off Flavor in Beer, Journal of Brewing Society of Japan, Sep. 4, 2012, vol. 107, No. 8, pp. 559-570. DOI: 10.6013/jbrewsocjapan.107.559.

A. Kaipainen, A study of the aroma profiles of non-alcohol beer by thermal desorption and GC-MS, Journal of High Resolution Chromatography, Nov. 1992, vol. 15, No. 11, pp. 751-755, DOI: 10.1002/jhrc.1240151110.

Mangindaan et al., "Beverage dealcoholization processes: Past, present, and future," Trends in Food Science & Technology 71, 2018, pp. 36-45, 10 pages.

Branyik et al., "A review of methods of low alcohol and alcohol-free beer production," Journal of Food Engineering 108, 2012, pp. 493-506, 14 pages.

International Search Report & Written Opinion issued in corresponding PCT application No. PCT/NL2018/050587 dated May 8, 2019, 10 pages.

Fritsch, et al. "Identification based on Quantitative Measurements and Aroma Recombination of the Character Impact Odorants in a Bavarian Pilsner-type Beer," Journal of Agricultural and Food Chemistry. 2005. vol. 53. pp. 7544-7551.

Campo, et al. "Solid phase extraction, multidimensional gas chromatography mass spectrometry determination of four novel aroma powerful ethyl esters Assessment of their occurrence and importance in wine and other alcoholic beverages," Journal of Chromatography A. vol. 1140. 2007. pp. 180-188.

Jackson, "A Technique for Identifying Foam Damage by Lipids," J. Inst. Brew., vol. 87, Jul.-Aug. 1981, 2 pages.

Fritsch et al., "Identification Based on Quantitative Measurements and Aroma Recombination of the Character Impact Odorants in a Bavarian Pilsnergtype Beer," J. Agric. Food Chem., 2005, 8 pages.

Japan Brewing Association, "Ingredients of Brewed Products", pp. 214-221, Dec. 10, 1999.

* cited by examiner

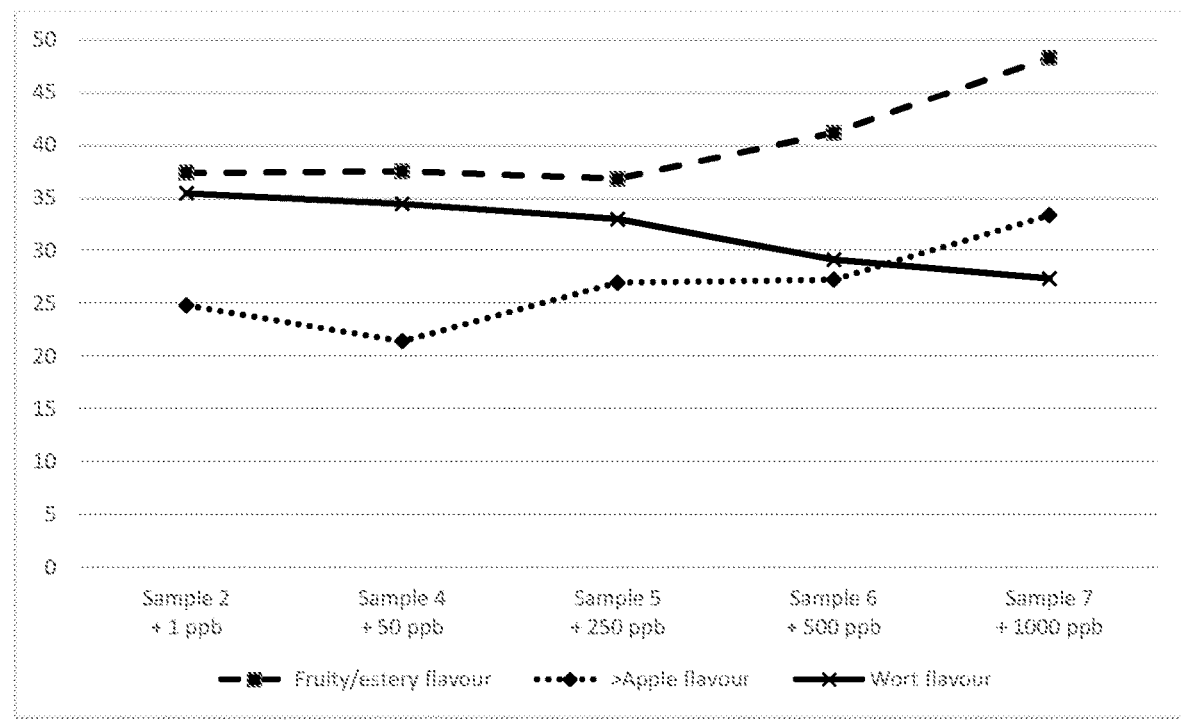

LOW-ALCOHOL BEER WITH REDUCED WORT FLAVOR

The present invention relates to an ester with particularly good wort-taste masking properties, which has been found an important contributor to beer taste.

BACKGROUND

Beer is among the most popular alcoholic beverages worldwide. It is prepared by fermentation of a sugars-containing aqueous matrix derived from grains, using yeast which converts the sugars to ethanol ("alcohol"). The production process of beer is generally known. Beer is commonly made from cereal such as barley, although other cereal types such as wheat or sorghum may also be used. Beer is commonly produced by a process that comprises the following basic steps: mashing a mixture of grain and water to produce a mash; separating the mash in wort and spent grain; boiling the is wort to produce a boiled wort; fermenting the boiled wort with live yeast (such as *Saccharomyces pastorianus* or *Saccharomyces cerevisiae*) to produce a fermented wort; subjecting the fermented wort to one or more further process steps (e.g. maturation and filtration) to produce beer; and packaging the beer in a sealed container, e.g. a bottle, can or keg.

In an exemplary process to produce a barley malt beer, the barley is malted, which means it germinated and subsequently dried ("kilning"), to produce malt. This process is important for the formation of taste and color compounds, and formation of enzymes which are important for further flavor development and starch degradation. Subsequently, the malt is milled and suspended in water ("mashing"). The mash is heated to facilitate starch degradation. Subsequent filtration results in wort, which is a more or less clarified aqueous solution of fermentable sugars, which also contains various flavors and aromas and many other compounds. In wort, both desirable and undesirable taste and aroma compounds are present. An overly "worty" flavor, which stems from excessive aldehyde presence, is generally considered undesirable.

The wort is boiled to sterilize it, to precipitate proteins, and to concentrate it. Optionally hop is added, to add bitterness and flavor. This mixture, after removal of the precipitate, is subjected to fermentation. Fermentation results in conversion of fermentable sugars in ethanol abd carbon dioxide, and also results in formation of various new flavor compounds, among which esters. At the same time, fermentation of beer removes most aldehydes, thereby preventing a worty flavor of the resulting beer. After fermentation, the beer may be filtered and/or stored, in order to optimize appearance and taste.

Health concerns and increased awareness of traffic safety associated with the alcohol content of beer have spiked interest in beer having low or even zero alcohol content. At present, there are two main techniques for the preparation of beer having low or zero alcohol content: de-alcoholisation of regular (alcohol-containing) beer, and preparation of beer by a process which limits alcohol formation by means of an adapted fermentation ("restricted alcohol fermentation").

De-alcoholisation of beer is performed on regularly brewed beer, and is designed to remove ethanol, but as little as possible other flavor components. De-alcoholisation may be achieved by for instance rectification, reverse osmosis or dialysis of regular beer. However, it is challenging to prevent flavor deprivation upon de-alcoholisation of beer. Consequently, a drawback of de-alcoholised beer is a flat flavor, which may be corrected by addition of flavor (taste and odor) compounds in order to obtain an acceptable beer. However, as flavor is complex due to the large variety of compounds which together are responsible for imparting flavor, de-alcoholised and subsequently flavored beer is generally considered less agreeable in taste than the taste of regular beer.

Low- or zero alcohol beer can also be prepared by restricted alcohol fermentation. Restricted alcohol fermentation is a process whereby wort is fermented under conditions where there is little or no ethanol formation (or at least, where the full fermentation process results in little or no net alcohol formation).

One important process is cold contact fermentation. When wort is fermented at low temperature, yeast does barely produce alcohol, although it does produce some flavor components such as esters, even though quantities per ester may differ from the quantities obtained from regular fermentation. Therefore, flavor correction by addition of flavors and aromas is generally necessary also for restricted-fermentation beer. Such beers are also generally considered less agreeable in taste than regular beer.

Existing low- or zero alcohol beers thus generally suffer from a lack of drinkability. Most people become saturated with the taste after only one or two glasses, which contrasts with the drinking of regular alcohol containing beer. The saturation with taste and resulting lack of drinkability is generally caused by an overpowering flavor, caused by overintense worty flavors due to high aldehyde levels, and too high sweetness. The present invention provides a beer which overcomes these drawbacks.

SUMMARY OF THE INVENTION

The invention discloses a beer having an ethanol content of 0-1.0 vol. %, comprising at least 0.001 µg/l ethyl-2-methylpentanoate (EMP). It has been found that EMP is an important contributor to beer flavor. EMP is effective in masking wort flavor, and thereby suppresses worty flavor. This is important in particular in zero- or low alcohol beer, because such beers generally suffer from worty flavor by increased aldehyde presence, relative to regularly brewed beer. In addition, the beer is generally considered less thick, and more refreshing. For this reason, the present beer is considered more drinkable than existing commercial zero alcohol beers

BRIEF DESCRIPTION OF THE DRAWINGS

The foregoing and other features and advantages of the present embodiments will be more fully understood from the following detailed description of illustrative embodiments taken in conjunction with the accompanying drawings in which:

FIG. 1 is a graph of perceived intensity of the flavor attributes wort, fruitiness and apple flavor of a fully flavored zero-alcohol beer obtained by vacuum distillation of a mixture of regular beer and cold-contact fermented beer, spiked with increasing quantities of EMP as described in Example 2.

DETAILED DESCRIPTION

In the present context, beer is to be understood in a broad sense, that is, beer may refer to any type of beer, including but not limited to ale, porter, stout, lager and bock beer. Beer is preferably a malt-based beer, that is, a beer prepared from the fermentation of wort prepared from (amongst others) malt. Preferably, beer is lager beer, which is a beer obtained by fermentation at 7-15° C. using a bottom-fermenting yeast, and subsequent lagering at low temperature. Lager beer includes for example pilsner. Most preferably, a beer as described herein is a pilsner. A pilsner is a pale lager beer. It is a purpose of the invention to provide a zero or low alcohol beer which has the taste and drinkability of a regular beer.

In the present text, "zero or low alcohol beer" is a beer having an ethanol content of 1.0 vol. % ("ABV") or less, preferably 0.5 vol. % or less, more preferably 0.2 vol. % or less. Such beers will also be called NA beer. Thus, NA beer is a beer having an ethanol content of 0-1.0 vol. %, such as preferably 0-0.5 vol. %.

The invention discloses an NA beer, having an ethanol content of 0-1.0 vol. %, preferably 0-0.5 vol. %, comprising at least 0.001 µg/l ethyl-2-methylpentanoate (EMP). An NA beer can be obtained by generally known methods.

One method to obtain an NA beer as herein defined is to subject a regularly brewed beer to a de-alcoholisation step, such as for example a rectification step, a reverse osmosis step, a dialysis step or a freeze concentration step to remove ethanol from the fermented beer. These techniques are for instance described in Brányik et al, J. Food. Eng. 108 (2012) 493-506, or in Mangindaan et al, Trends in Food Science&Technology 71 (2018) 36-45.

The de-alcoholisation of regular beer leads to a de-alcoholised beer, which is one type of NA beer as herein defined. Regular beer, in the present context, is regularly brewed beer, having an ethanol content of 1-15 vol. %, preferably 3-9 vol. %. Preferably, the regular beer is regular lager beer. The skilled person is capable of obtaining regular beer, among which regular lager beer, for instance by the methods described in The Brewers Handbook (second edition) of Ted Goldammer (2008, Apex publishers). Alternatively, regular beer can be obtained commercially. It has presently been found that regular beer inherently comprises EMP, which forms during fermentation under regular (non-restricted) conditions.

The de-alcoholisation of regular beer results in beer having a low quantity of ethanol, but also results in removal of many esters and other compounds which are responsible for the flavor of the beer. Such beers may be flavored with a flavoring prior to consumption, in order to impart flavor to the de-alcoholised beer. Such flavoring did not comprise EMP, as the importance of EMP as a component in beer flavoring has so far not been recognized.

In the present context, a de-alcoholised beer is a preferred type of NA beer. Further preferably, in the present context, the NA beer is a de-alcoholised beer obtained by rectification.

Another method to obtain NA beer is to make beer by a restricted-fermentation process, which gives a restricted-fermentation beer. A restricted-fermentation beer is another type of NA beer as herein defined.

A restricted-fermentation beer is defined as a fermented beer which has been obtained by restricted ethanol fermentation of wort. Restricted ethanol fermentation of wort is fermentation which does not result in significant net ethanol formation, that is, restricted fermentation as defined herein results in 1 vol. % or less, preferably 0.5 vol. % or less ethanol, more preferably 0.2 vol. % or less. A restricted-fermentation beer thus has an ethanol content of 1.0 vol. % or less, preferably 0.5 vol. % or less, more preferably 0.2 vol. % or less.

Restricted fermentation of wort is a process in which the product directly obtained from the fermentation has an ethanol content of 1.0 vol. % or less, preferably 0.5 vol. % or less, more preferably 0.2 vol. % or less. The skilled person is aware of various restricted fermentation techniques which do not result in significant net ethanol formation. Examples are restricted ethanol fermentation of wort characterized by a temperature below 7° C., preferably −1-4° C., such as −0.5-2.5° C., preferably for a period of 8-72 hours, more preferably 12-48 hrs ("cold contact fermented beer"); and/or a short (e.g. less than 2 hours) fermentation time, which fermentation stopped quickly by temperature inactivation, such as by rapid cooling to −0.5-1° C., optionally followed by subsequent pasteurization ("arrested fermentation beer"); and/or fermentation by a yeast strain which produces relatively low quantities of ethanol under the applied fermentation conditions, such as for example a yeast strain which produces less 0.2 g ethanol per gram fermentable sugar in the wort, preferably less than 0.1 g ethanol per grain fermentable sugar. Suitable strains (e.g. Crabtree negative strains) are known in the art, and the quantity of ethanol produced under varying fermentation conditions can be determined by routine experiments ("yeast-restricted beer"); and/or fermentation using a first, ethanol-producing yeast strain, in the presence of a sufficient quantity of a second yeast strain which consumes ethanol, such as *Saccharomyces rouxii*, to consume substantially all ethanol produced by the first yeast strain; and/or wort having a content of fermentable sugars such that max 1.0 vol. % of alcohol is produced after completion of its fermentation. In this case, the wort generally has a content of fermentable sugars of less than 17.5 g/l, preferably less than 12 g/l, more preferably less than 8 g/l ("sugar-deprived wort beer").

A restricted-fermentation beer has not been subjected to a de-alcoholisation step to attain the said ethanol content of 1.0 vol. % or less, preferably 0.5 vol. % or less, more preferably 0.2 vol. % or less. The skilled person knows various suitable techniques for de-alcoholisation of a fermented beer, and none of these techniques has been applied to attain the said ethanol content. A restricted-fermentation beer in the present context, may however optionally be subjected to a de-alcoholisation step to reduce the ethanol content from the said 1.0 vol. % or less, preferably 0.5 vol. %, more preferably 0.2 vol. % or less, as obtained from the fermentation, to a further reduced ethanol content. Preferably however, a restricted-fermentation beer as defined herein has not been subjected to a de-alcoholisation step at all.

A de-alcoholisation step for further reducing the ethanol content of a restricted fermentation beer from 1.0 vol. % or less as defined above to even lower quantities of ethanol is well-known in the art. This has been described above, with exemplary reference to Mangindaan et al and Brányik et al.

The restricted-fermentation beer in the present context is preferably a sugar-deprived wort beer, a yeast-restricted beer, an arrested fermentation beer, or a cold contact fermented beer. In one embodiment, the restricted-fermentation beer is a sugar-deprived wort beer. In a further embodiment, the restricted-fermentation beer is a yeast-restricted beer. In yet a further embodiment, the restricted-fermentation beer is an arrested fermentation beer. In yet a further embodiment, the restricted-fermentation beer is a cold contact fermented beer. In preferred embodiments, the restricted-fermentation beer is a cold contact fermented beer. This is because cold contact fermented beer comprises relatively higher quantities of worty flavors than the other types of restricted fermentation beer (see Brányik et al, cited above).

Cold contact fermentation is well-known in the art, and the skilled person may obtain a cold contact fermented beer by any means known in the art or disclosed herein. An exemplary method to obtain a cold contact fermented beer is for example described in Brányik et al, cited above. Alternatively, cold-contact fermented beer can be obtained commercially.

Although restricted fermentation may result in the formation of some ester compounds, the quantity and type of ester differs from the ester mix found in regularly brewed beer. For this reason, the taste is less agreeable, which is corrected by supplementation of a suitable flavoring to impart the desired flavor. It has presently been found that restricted fermentation does not result in significant formation of EMP.

It has been found that EMP is a component in regularly brewed beer which is important for imparting beer flavor. This component is present in significantly lower quantities in known zero- or low alcohol beer, due to low formation in a restricted-fermentation process, among which a cold contact process, and/or due to reduced quantities being present after de-alcoholisation.

An important function of EMP is masking wort flavor. EMP furthermore imparts a fruity, apple-like flavor, and results in the refreshing character which is associated with regular beer. For these reasons, it has been found beneficial to enrich NA beer with EMP, such as in a quantity of at least 0.001 µg/l ("ppb"). Consequently, the invention furthermore discloses use of ethyl-2-methylpentanoate to mask wort flavor and/or to impart refreshing flavor.

The quantity of EMP in the NA beer is preferably at least 0.004 µg/l, more preferably at least 0.01 µg/l, even more preferably at least 0.1 µg/l. Preferred quantities of EMP include 0.1-1000 µg/l, preferably 1-800 µg/l, more preferably 10-500 µg/l. In preferred embodiments, the quantity of EMP 50-600 µg/l.

An important effect of EMP is to mask the worty flavor usually present in NA beer, in particular cold contact fermented beer. Nonetheless, it is preferable if the beer comprises relatively low aldehyde quantities. In preferred embodiments, the total of aldehydes in the beer, defined as the total of 2-methylpropanal, 2-methylbutanal, 3-methylbutanal, 3-methylthiopropionaldehyde, phenylacetaldehyde, hexanal, trans-2-nonenal, benzaldehyde and furfural is less than 600, preferably less than 400, more preferably less than 200, most preferably less than 80 µg/l. In further preferred embodiments, the total of Strecker aldehydes (defined as the total of 2-methylpropanal, 2-methylbutanal, 3-methylbutanal, 3-methylthiopropionaldehyde, and phenylacetaldehyde) is less than 200, preferably less than 150, more preferably less than 100, most preferably less than 50 µg/l. The quantity of EMP in NA beer with these aldehyde quantities is at least 0.001 µg/l, preferably at least 0.004 µg/l, more preferably at least 0.01 µg/l, even more preferably at least 0.1 µg/l, such as 0.1-1000 µg/l, preferably 1-800 µg/l, more preferably 10-500 µg/l. In preferred embodiments, the quantity of EMP 50-600 µg/l. It is preferred that when higher quantities of aldehydes are present, the quantity of EMP is also higher.

It is preferred if the zero- or low alcohol beer is not very sweet, because this improves drinkability. The total sugar content of the obtained NA beer, defined as the total of glucose, fructose, sucrose, maltose, and maltotriose, is preferably at least 0.2 g/100 ml. It is preferred if the total sugar content is relatively low, such as at most 3 g/100 ml, preferably at most 2 g/100 ml. In preferred embodiments, the total sugar content is 0.5-2.0 g/100 ml, preferably 1.2-2.0 g/100 ml.

The obtained beer preferably comprises at least 0.2 g/100 ml maltotriose. The beer further preferably comprises at least 0.05 g/100 ml glucose and/or at least 0.05 g/100 ml fructose. It is further preferred if the total sugar content of the obtained beer comprises 50-100 wt. % of maltose, preferably 50-80 wt. %, more preferably 50-65 wt. %. The maltose content of the final beer is preferably at least 0.5 g/100 ml.

A preferred beer obtained with the present method further comprises 20-250 mg/l of free amino nitrogen (FAN), more preferably 50-200 mg/l, more preferably 75-150 mg/l. Free amino nitrogen, as used herein, refers to the total quantity of free amino compounds as determined by the NOPA method. This method results in quantification of primary amino compounds, such as free amino acids, small peptides and ammonia. The recited quantity of FAN is an important aspect of the final beer taste and color.

A preferred beer obtained with the present method further comprises less than 5 mg/l acetaldehyde, preferably less than 3 mg/l. This is important for the flavor profile of the obtained beer.

A beer of the invention preferably also comprises 1-20 µg/l, preferably 1.5-5 µg/l ethyl propanoate, which is important for imparting taste. A beer of the invention further preferably comprises 0.05-30 mg/l ethyl acetate, preferably 0.1-15 mg/l ethyl acetate. This, also, is important for imparting taste. The beer obtained from the distillation further preferably comprises isoamyl acetate in a quantity of 0.05-7.5 mg/l, preferably 0.08-4.5 mg/l, more preferably 0.1-1 mg/l.

Advantages of the present beer include improved flavor characteristics, among which reduced sweetness and reduced worty flavor. This results in among others a less overpowering flavor. The present beer has low sweetness, and favorable aldehyde levels even relative to this lowered sweetness. This has the result that at lower sweetness and taste intensity, the beer is not considered worty, and consumers do not become saturated with the taste after only a few beers. In addition, the beer is generally considered less thick, and more refreshing. Thus, a beer of the present invention is more drinkable than existing zero-alcohol beers.

The invention furthermore discloses a method for preparing a beer having an alcohol content of 0-1.0 vol. %, preferably 0-0.5 vol. %, comprising a step of combination of a zero- or low alcohol beer as defined above with ethyl-2-methylpentanoate. In one embodiment, the EMP can be combined with the NA beer by addition as a flavoring. In such embodiments, the EMP can be obtained commercially, and/or it can be obtained by isolation from a natural source, such as by isolation from regularly brewed beer. Thus, in preferred embodiments, the combination with ethyl-2-methylpentanoate is achieved by combination with a flavoring comprising ethyl-2-methylpentanoate.

In one embodiment, the flavoring is flavoring comprising ethyl-2-methylpentanoate. In this embodiment, the flavoring may comprise a flavor mix designed to attain specific quantities of esters in the final beer. The flavoring may also comprise other flavors compounds and aromas, such as (organic) acids, dialdehydes, higher alcohols, salts and the like.

In other embodiments, the flavoring can be a regular beer, preferably regular lager beer, most preferably a pilsner. An advantage of using regular beer as a flavoring is that regular beer comprises a mix of flavors and aromas which are perceived as natural by a beer consumer, which leads to an NA beer having a regular beer-like flavor and aroma profile.

In some embodiments, a regular beer flavoring may be a flavoring derived from regular beer by concentration, such as by partial or full removal of alcohol and/or water to obtain a regular beer concentrate, which may be in solid or liquid form. Suitable techniques to obtain such a beer concentrate are for example freeze-drying and freeze-concentration, although the skilled person can come up with countless ways to obtain a suitable beer concentrate using his common general knowledge.

In one embodiment, the flavoring is regular beer, preferably regular lager beer. Preferably, in this embodiment, the method comprises a step of mixing restricted-fermentation beer, preferably cold contact fermented beer, with regular beer, preferably regular lager beer. It is preferred if the restricted-fermentation beer and the regular beer are mixed in a volumetric ratio of 1:99-99:1, preferably 5:95-50:50.

In some embodiments, the mixing step is followed by a vacuum distillation, such as to remove excess aldehydes deriving from the restricted-fermentation beer. In such embodiments, it can be an advantage to add a further flavoring, for instance a flavoring comprising a flavor mix as defined above, after the said distillation step in order to attain a desired flavor profile.

For the purpose of clarity and a concise description features are described herein as part of the same or separate embodiments, however, it will be appreciated that the scope of the invention may include embodiments having combinations of all or some of the features described.

The invention will now be further illustrated by the following, non-limiting examples.

Methods
Determination of Aldehydes in Beer Using On-Fibre Derivatization Solid Phase Micro Extraction and Gas Chromatography-Mass Spectrometry.
Sample Preparation Under a CO2 atmosphere, 30.0 g of beer sample was weighed in a 40 ml vial. With a 50 µl gas-tight syringe, 30 µl of internal standard solution was added to each sample. Next, still under CO2 conditions, two 10 ml headspace vial were filled with 4.0 g of sample. Thus, the beer sample is analyzed in duplicate.

Derivatization Procedure

A stock solution of ca 200 mg/l O-(2,3,4,5,6-pentafluorobenzyl)-hydroxylamine (PFBHA) in deionized water was prepared. A standard 20 ml clear glass crimp-cap headspace vial was filled with 14 g of the PFBHA solution. Next, an SPME fibre (Supelco) was placed in the headspace of the derivatization vial for 10 minutes at 30° C. to soak the PDMS/DVB phase of the SPME fibre with the derivatization agent. The SPME fibre soaked with PFBHA was then placed in the headspace of a beer sample (4.0 g in 10 ml vial, filled under a CO2 atmosphere), leading to PFBHA-derivatives of the aldehydes of interest. The extraction conditions were chosen at 30 minutes at 30° C.

GC Conditions

An Agilent 7890A gas chromatograph, equipped with a split/splitless inlet, was used for this method. Optimal separation of the PFBHA/aldehyde compounds was achieved with a 30 m×0.25 mm×0.25 µm VF17MS column (Agilent). Some compounds co-elute, but in these cases the selectivity of the MS was able to circumvent the need of chromatographic separation. For example trans-2-nonenal, phenylacetaldehyde and decanal all co-elute, but the mass spectrometer targets selective ions for each compound.

Helium at 1 ml/min is used as carrier gas. A split ratio of 5 used to optimize peak width and sensitivity. The oven was programmed as 50° C. (2 minutes) with a 10° C./min rise to 230° C., followed by a 30° C./min rise to 290° C. (hold 2 minutes).

MS Conditions

The Agilent 5975C MSD was set-up for negative chemical ionization (NCI).

For all aldehydes targeted in this methodology, a suitable ion fragment was chosen. In most cases, a compound specific fragment was chosen rather than the most abundant fragment. This allows the selective determination of the target compounds of interest. In most cases, the molecular ion Mw minus m/z 20 (loss of H-F) is best suited.

As most PFBHA-aldehyde compound consists of two peaks (syn- and anti-), the peak areas are summed. Quantification of all aldehyde compounds was possible by setting up appropriate calibration curves based on standard addition to Heineken beer.

Determination of Ester and Alcohol Compounds in Beer Using Stir Bar Sorptive Extraction and Gas Chromatography-Mass Spectrometry Due to the large concentration range of the analytes, the samples have to be analyzed twice with different GC-MS methods; one for the determination of high concentration compounds, and one for the low concentration compounds. The difference between the two methods is the operation mode of the mass selective detector. Iso-amyl acetate was determined using the high concentration method, and ethyl acetate was determined using the low concentration method.

Sample Preparation

In duplicates, 30.0 g of beer sample was weighed in a 40 ml vial. With a 50 µl gas-tight syringe, 30 µl of internal standard solution was added to each sample. Next, a clean and pre-conditioned twister was added to each sample. A 60 position stir plate was used to extract the samples. Extraction time is one hour. In order prevent the formation of light-induced compounds, the samples are covered from light.

Instrument Conditions

The Agilent 7890B gas chromatograph is coupled to an Agilent 5977A MSD. Sample introduction is performed by a Gerstel MPS2-XT robot, in combination with a TDU-2 thermal desorption unit and CIS-4 controlled temperature inlet (both from Gerstel). Main capillary column is a 50 m×0.25 mm×0.25 µm DB-5MS UI. Helium at 1.5 ml/min is used for carrier gas. The thermal desorption of the twisters was performed in solvent vent mode, trapping the eluents at −20° C. on a tenax-filled liner. During the heating step, the injector switched to a split ratio 100:1 and 6:1 for the high and low concentration method respectively. The oven was programmed as 40° C. (2 minutes) with a 10° C./min rise to 280° C. (hold 1 minutes). The MSD is set for scan mode (33-300 m/z) in the high concentration method, and in single ion mode for the low concentration method.

Quantification of all compounds was made possible by the preparation of calibration curves (standard addition to a suitable matrix beer). All calibrations are performed in both alcohol containing and 0.0% alcohol containing beverages.

Determination of Sugar Content in Wort, Beer and Cider

The sugar content was measured with Ultra Performance Liquid Chromatography (UPLC). UPLC can be suitably conducted at a temperature of 65° C. A suitable choice for the eluent is a mixture of acetonitrile/water, for example in a 75/25 volume ratio. The detector used is typically a Refractive Index (RI) detector. The sugar content of a sample was determined by comparing the UPLC curve of the sample with calibration curves of standard samples with known sugar concentrations.

The samples for UPLC were prepared as follows. A sample of beer or wort was diluted by a factor 5 by addition of acetonitrile/water mixture (50/50—equal volume parts). If present, $CO_2$ was removed prior to dilution (e.g. by shaking or stirring the sample). After dilution, the sample was filtrated to obtain a clear solution. The filtered sample was injected into the UPLC at 65° C. using the above-mentioned eluent.

Determination of Free Amino Nitrogen (FAN)

The amount of free amino nitrogen was measured according to the Nitrogen by O-Phthaldialdehyde Assay (NOPA) method. The NOPA method was conducted using a photometric analyzer (e.g. Gallery™ Plus Photometric Analyzer). According to the NOPA method, a test sample is subjected to a treatment with ortho-phtaldialdehyde (OPA) and N-acetylcystein (NAC). This treatment will results in the derivatization of primary amino groups present in the test sample under the formation of isoindoles. The content of the isoindoles is subsequently determined using the photometric analyzer at a wavelength of 340 nm. The free amino nitrogen (expressed in mg FAN/l) can then be calculated based on the measured content of the isoindoles. If necessary, the beer or wort sample is first subjected to centrifugation to clarify the sample and/or to a $CO_2$ removal step (e.g. by stirring or shaking the sample) before analysis.

Determination of Ethanol in Beer

The ethanol content was measured using a photometric analyzer (e.g. Gallery™ Plus Photometric Analyzer). The test sample is subjected to an enzymatic method wherein the ethanol present in the sample is converted to acetaldehyde with alcohol dehydrogenase (ADH). The acetaldehyde content is subsequently determined using the photometric analyzer at a wavelength of 340 nm. The ethanol content can be calculated based on the acetaldehyde content. If necessary, the beer or wort sample is first subjected to centrifugation to clarify the sample and/or to a $CO_2$ removal step (e.g. by stirring or shaking) before analysis.

Example 1

The Effect of Ethyl-2-Methylpentanoate as a Wort Flavor Masker and Imparting a Refreshing Fruity Beer Flavor.

A zero-alcohol beer was prepared by rectification. The resulting blank beer was relatively low in flavors such as esters. To the blank beer, ethyl-2-methylpentanoate (EMP) was added as a flavoring at 50 ppb. There were no further differences between the blank beer and the spiked beer. The sensory differences between the blank beer and EMP spiked beer were indicated by a trained sensory panel of 17 persons. The sensory panel indicated the differing flavor attributes between the two beers. The number of panellists indicating higher presence of flavor attributes is presented in Table 1.

From the results, it can be seen that EMP has a particularly strong wort flavor masking effect. Wort flavor (which stems from aldehydes) was considered to be more abundant in the blank beer by 16 out of 17 panelists. In the blank beer spiked with 50 µg/l EMP, the wort flavor was suppressed. 50 µg/l of EMP thus strongly suppresses wort flavor.

In addition, the presence of EMP imparts an acid-like, fruity and citrus flavor. Thus, the spiked beer is considered more refreshing.

TABLE 1

|  | Blank beer | Blank beer + 50 µg/l EMP |
| --- | --- | --- |
| Bitter | 5 | 6 |
| Sweet | 8 | 4 |
| Acid | 3 | 7 |
| Generally fruity | 0 | 16 |
| Citrus/refreshing | 0 | 11 |
| Wort | 16 | 0 |
| Metallic | 10 | 2 |
| Sulphur | 12 | 0 |
| Astringent | 5 | 0 |
| Isovaleric acid | 1 | 7 |
| Diacetyl | 0 | 2 |
| Herb-like | 4 | 0 |
| Tantalizing | 1 | 0 |
| Thin | 0 | 1 |

Example 2

The Effect of Ethyl-2-m Ethylpentanoate as a Wort Flavor Masker and as Imparting a Refreshing Fruity Beer Flavor in Full Flavor Beer.

A zero-alcohol beer obtained by vacuum distillation of a mixture of regular beer and cold-contact fermented beer, and fully flavored to impart beer taste using a flavor mix NOT comprising EMP, was spiked with increasing quantities of EMP (1, 50, 250, 500 and 1000 ppb EMP). A taste panel consisting of 17 trained taste experts scored the perceived intensity for 3 flavor attributes: wort, fruitiness and apple flavor. The results are shown in FIG. 1.

The results show that increasing the quantity of EMP in the zero- or low alcohol beer increasingly masks the worty flavor notes, and increases the fruity flavor. In the context of a flavor mix, EMP imparts an apple-like flavor, and imparts a strong refreshing effect.

Example 3

Comparison of the Obtained Beer with Commercial Zero- or Low Alcohol Beer Types

A beer obtained using the present method was compared to existing zero-alcohol beers by a taste panel of 17 trained panelists. Beers were evaluated on specific flavor attributes, including sweetness, wort flavor and total flavor intensity, as well as other flavor notes. For each attribute the perceived intensity was indicated on a line scale. All panelists evaluated all beers on all attributes, and the results were averaged. The results are given in table 2.

A beer obtained with the present method has a less worty flavor and less sweet taste, than commercial zero alcohol beers. The likelihood that consumers become saturated with the taste within only a few beers is thus lower, because the taste is less overpowering. In addition, the beer is generally considered less thick, and more refreshing. For this reason, the present beer is considered more drinkable than existing commercial zero alcohol beers.

TABLE 2

| | Present beer | commercial beer A | Commercial beer B | Commercial beer C | Commercial beer D | Commercial beer E |
|---|---|---|---|---|---|---|
| Sweet taste | 18 | 28 | 26 | 23 | 23 | 17 |
| Wort flavor | 27 | 39 | 42 | 28 | 33 | 38 |
| Fruity/estery flavor | 31 | 17 | 18 | 33 | 20 | 16 |
| >Peardrop flavor | 29 | 14 | 12 | 21 | 15 | 12 |
| >Tropical fruit flavor | 9 | 5 | 7 | 19 | 2 | 1 |
| >Green apple flavor | 11 | 2 | 4 | 5 | 2 | 3 |
| Hop flavor | 14 | 10 | 8 | 24 | 11 | 17 |
| Vinegar flavor | 2 | 1 | 0 | 5 | 1 | 10 |
| Total intensity | 40 | 44 | 45 | 46 | 43 | 47 |
| Refreshing mouthfeel | 42 | 33 | 35 | 32 | 37 | 36 |
| Thickness mouthfeel | 27 | 32 | 32 | 29 | 28 | 29 |
| Warming mouthfeel | 5 | 5 | 2 | 5 | 5 | 3 |
| Sweet aftertaste | 18 | 25 | 25 | 23 | 23 | 15 |

The invention claimed is:

1. A beverage comprising restricted-fermentation beer, restricted-fermentation beer being defined as beer having an ethanol content of 1.0 vol. % or less obtained from restricted ethanol fermentation of wort, said beverage comprising Strecker aldehydes, defined as a total of 2-methylpropanal, 2-methylbutanal, 3-methylbutanal, 3-methylthiopropionaldehyde, and phenylacetaldehyde, in a quantity of less than 200 µg/l and said beverage having an ethanol content of 0-1.0 vol. %, and said beverage spiked with at least 10 µg/l ethyl-2-methylpentanoate to the restricted-fermentation beer.

2. The beverage according to claim 1, wherein the quantity of ethyl-2-methylpentanoate is at least 50 µg/l.

3. The beverage according to claim 1, wherein a total of aldehydes, defined as a total of 2-methylpropanal, 2-methylbutanal, 3-methylbutanal, 3-methylthiopropionaldehyde, phenylacetaldehyde, hexanal, trans-2-nonenal, benzaldehyde and furfural is less than 600 µg/l.

4. The beverage according to claim 1, wherein a total sugar content, defined as a total of glucose, fructose, sucrose, maltose, and maltotriose, is at least 0.2 g/100 ml.

5. The beverage according to claim 1, wherein a total sugar content, defined as a total of glucose, fructose, sucrose, maltose, and maltotriose, comprises at least 50 wt. % of maltose.

6. The beverage according to claim 1, further comprising 1-20 µg/l ethyl propanoate, and/or 0.05-30 mg/l ethyl acetate.

7. A method for preparing a beverage having an alcohol content of 0-1.0 vol. % having masked wort flavor, comprising a step of spiking of a restricted-fermentation beer, defined as beer having an ethanol content of 1.0 vol. % or less obtained from restricted ethanol fermentation of wort, with at least 10 µg/l ethyl-2-methylpentanoate.

8. The method according to claim 7, wherein the spiking with ethyl-2-methylpentanoate is achieved by spiking with a flavoring comprising ethyl-2-methylpentanoate.

9. The method according to claim 7, further comprising spiking with a flavoring wherein the flavoring is a flavor mix comprising ethyl-2-methylpentanoate.

10. The method according to claim 7, further comprising combination with a flavoring wherein the flavoring is a regular beer.

11. The method according to claim 7, comprising a step of mixing the restricted-fermentation beer with regular beer.

12. The method according to claim 7, wherein the restricted-fermentation beer and a regular beer are mixed in a volumetric ratio of 1:99-99:1.

13. The method according to claim 11, wherein the mixing step is followed by a vacuum distillation, and optional further addition of ethyl-2-methylpentanoate.

14. A method of using at least 10 µg/l ethyl-2-methylpentanoate to mask worty flavor and/or to impart a less overpowering flavor to a restricted-fermentation beer, defined as beer having an ethanol content of 1.0 vol. % or less obtained from restricted ethanol fermentation of wort, comprising spiking the restricted fermentation beer with the at least 10 µg/l ethyl-2-methylpentanoate.

15. The beverage according to claim 1, wherein the quantity of ethyl-2-methylpentanoate is 10-1000 µg/l.

16. The beverage according to claim 1, wherein the quantity of ethyl-2-methylpentanoate is 10-800 µg/l.

17. The beverage according to claim 1, wherein a total of aldehydes, defined as a total of 2-methylpropanal, 2-methylbutanal, 3-methylbutanal, 3-methylthiopropionaldehyde, phenylacetaldehyde, hexanal, trans-2-nonenal, benzaldehyde and furfural is less than 400 µg/l.

18. The beverage according to claim 1, wherein a total of aldehydes, defined as a total of 2-methylpropanal, 2-methylbutanal, 3-methylbutanal, 3-methylthiopropionaldehyde, phenylacetaldehyde, hexanal, trans-2-nonenal, benzaldehyde and furfural is less than 200 µg/l.

19. The beverage according to claim 1, wherein a total of aldehydes, defined as a total of 2-methylpropanal, 2-methylbutanal, 3-methylbutanal, 3-methylthiopropionaldehyde, phenylacetaldehyde, hexanal, trans-2-nonenal, benzaldehyde and furfural is less than 80 µg/l.

20. The beverage according to claim 1, wherein a total of Strecker aldehydes, defined as the total of 2-methylpropanal, 2-methylbutanal, 3-methylbutanal, 3-methylthiopropionaldehyde, and phenylacetaldehyde, is less than 150 µg/l.

21. The beverage according to claim 1, wherein a total of Strecker aldehydes, defined as a total of 2-methylpropanal, 2-methylbutanal, 3-methylbutanal, 3-methylthiopropionaldehyde, and phenylacetaldehyde, is less than 100 µg/l.

22. The beverage according to claim 1, wherein a total of Strecker aldehydes, defined as a total of 2-methylpropanal, 2-methylbutanal, 3-methylbutanal, 3-methylthiopropionaldehyde, and phenylacetaldehyde, is less than 50 µg/l.

23. The beverage according to claim 1, wherein a total sugar content, defined as a total of glucose, fructose, sucrose, maltose, and maltotriose, is 0.5-2.0 g/100 ml.

24. The beverage according to claim 1, further comprising 1.5-5 µg/l ethyl propanoate and/or 0.1-15 mg/l ethyl acetate.

25. The method according to claim 7, further comprising combination with a flavoring wherein the flavoring is regular lager beer.

26. The method according to claim 11, wherein the restricted-fermentation beer is cold contact fermented beer.

27. The method according to claim 26, wherein the regular beer is lager beer.

28. The method according to claim 7, wherein the restricted-fermentation beer and a regular beer are mixed in a volumetric ratio of 5:95-50:50.

\* \* \* \* \*